(12) United States Patent
Anderson et al.

(10) Patent No.: US 6,836,775 B2
(45) Date of Patent: Dec. 28, 2004

(54) METHOD, APPARATUS AND COMPUTER PROGRAM PRODUCT FOR FILE SYSTEM REFERRALS

(75) Inventors: Owen Theodore Anderson, Chapel Hill, NC (US); Craig Fulmer Everhart, Pittsburgh, PA (US); Boaz Shmueli, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/132,870

(22) Filed: Apr. 24, 2002

(65) Prior Publication Data

US 2003/0204530 A1 Oct. 30, 2003

(51) Int. Cl.[7] .............................. G06F 17/30
(52) U.S. Cl. ........................ 707/10; 707/10; 707/205
(58) Field of Search .............................. 707/1–10, 100, 707/104.1, 205; 711/173, 112

(56) References Cited

U.S. PATENT DOCUMENTS

| | | | |
|---|---|---|---|
| 5,842,214 A | 11/1998 | Whitney et al. | 707/10 |
| 5,926,805 A | 7/1999 | Hurvig et al. | 707/2 |
| 6,026,402 A | 2/2000 | Vossen et al. | 707/9 |
| 6,061,743 A | 5/2000 | Thatcher et al. | 709/302 |
| 6,078,929 A | 6/2000 | Rao | 707/200 |
| 6,081,898 A | 6/2000 | Miller et al. | 713/201 |
| 6,105,062 A | 8/2000 | Andrews et al. | 709/223 |
| 6,185,574 B1 | 2/2001 | Howard et al. | 707/200 |
| 6,256,031 B1 | 7/2001 | Meijer et al. | 345/357 |
| 6,266,682 B1 | 7/2001 | LaMarca et al. | 707/501 |
| 6,687,701 B2 * | 2/2004 | Karamanolis et al. | 707/10 |
| 2001/0003818 A1 | 6/2001 | Pingel et al. | 704/102 |
| 2001/0004260 A1 | 6/2001 | Bauer et al. | 345/418 |
| 2003/0023826 A1 * | 1/2003 | McMichael et al. | 711/173 |

FOREIGN PATENT DOCUMENTS

JP   2000207258 A   1/1999

OTHER PUBLICATIONS

Cline, SD, "Golden Retriever", Library Software Review, vol. 4, No. 1, pp. 24–27, Jan.–Feb. 1985.
"A Virtual File System (VFS) across multiple network nodes and disks", IBM Research Disclosure No. 426, Oct. 1999, Article 78, p. 1368.
"Mapping a Relational Database to a Hierarchical File System", IBM Technical Disclosure Bulletin, vol. 38, No..10, Oct. 1995, pp. 309–312.
Bartley, et al., "A Method for Adding External Security Policy to file System Resources Through Symbolic Link References", IBM, U.S. patent application filed Apr. 26, 2001, Ser. No. 09/843,072.
"Separation of file/directory pathname canonicalization from validation", IBM Research Disclosure No. 427, Nov. 1999, Article 119, p. 1543.

* cited by examiner

Primary Examiner—Charles Rones
Assistant Examiner—Neveen Abel-Jalil
(74) Attorney, Agent, or Firm—Anthony V. S. England; Randall J. Bluestone (57) ABSTRACT

In one form, in a method for making file systems accessible, a referring file system attribute is created, responsive to a first file system having a referral object referring to a second file system. The referring file system attribute describes referring file system identification for the first file system. A path attribute is created, responsive to the first file system having the referral object, describing a path from a root of the first file system to the referral object. A referred file system attribute is created, responsive to the first file system having the referral object, describing a referred file system identification for the second file system. A parent attribute is created, responsive to the first file system having the referral object, describing a parent flag for the second file system.

40 Claims, 9 Drawing Sheets

| Referring File System Attribute (360) | Path Attribute (370) | Referred File System Attribute (380) | Parent Attribute (390) | |
|---|---|---|---|---|
| *ROOT* | | FS1 | TRUE | 580 |
| FS1 | /A/D | FS2 | TRUE | 585 |
| FS1 | /A/C | FS3 | TRUE | 590 |
| FS2 | /E | FS3 | FALSE | 595 |

METHOD, APPARATUS AND COMPUTER PROGRAM PRODUCT FOR FILE SYSTEM REFERRALS

BACKGROUND

1. Field of the Invention

The present invention relates to file systems, and more particularly to storing file system referrals.

2. Related Art

Computer based information storage systems, such as databases and file systems have been widely utilized by users to access, store, modify and update persistent data. For many companies, the information storage system is considered to be a strategic capital asset that is deployed to make everyday business decisions. Persistent data may include computer files such as source code, word processing documents, data elements and information such as employee records, customer records, and content of web pages.

In a computer system, a file system defines the manner in which files are named and placed logically for storage and retrieval. Generally many file systems provide a hierarchical (tree) structure for managing files. A file is placed in a directory (or a folder or subdirectory) at the desired place in the tree structure. In the file system that is organized as a hierarchy, the root directory may include sub-directories that may include other sub-directories. Typically, a tree file system has only one root. In many operating systems, the root directory has no name. A special character that separates directories in a file system typically represents the root directory. For example, in UNIX-based systems, the root directory is represented simply as: /, and in Windows operating system, the root directory is represented as: \.

A path is the route from the root directory of a file system to a particular file. A pathname (or path name) is the specification of that path. A file system also includes a format for specifying a path to a file through the structure of directories. Well known examples of file systems include UNIX file system ("UFS"), Windows NT file system ("NTFS"), Distributed File System ("DFS"), Network File System ("NFS") and the Andrew file system ("AFS").

Figure 1:
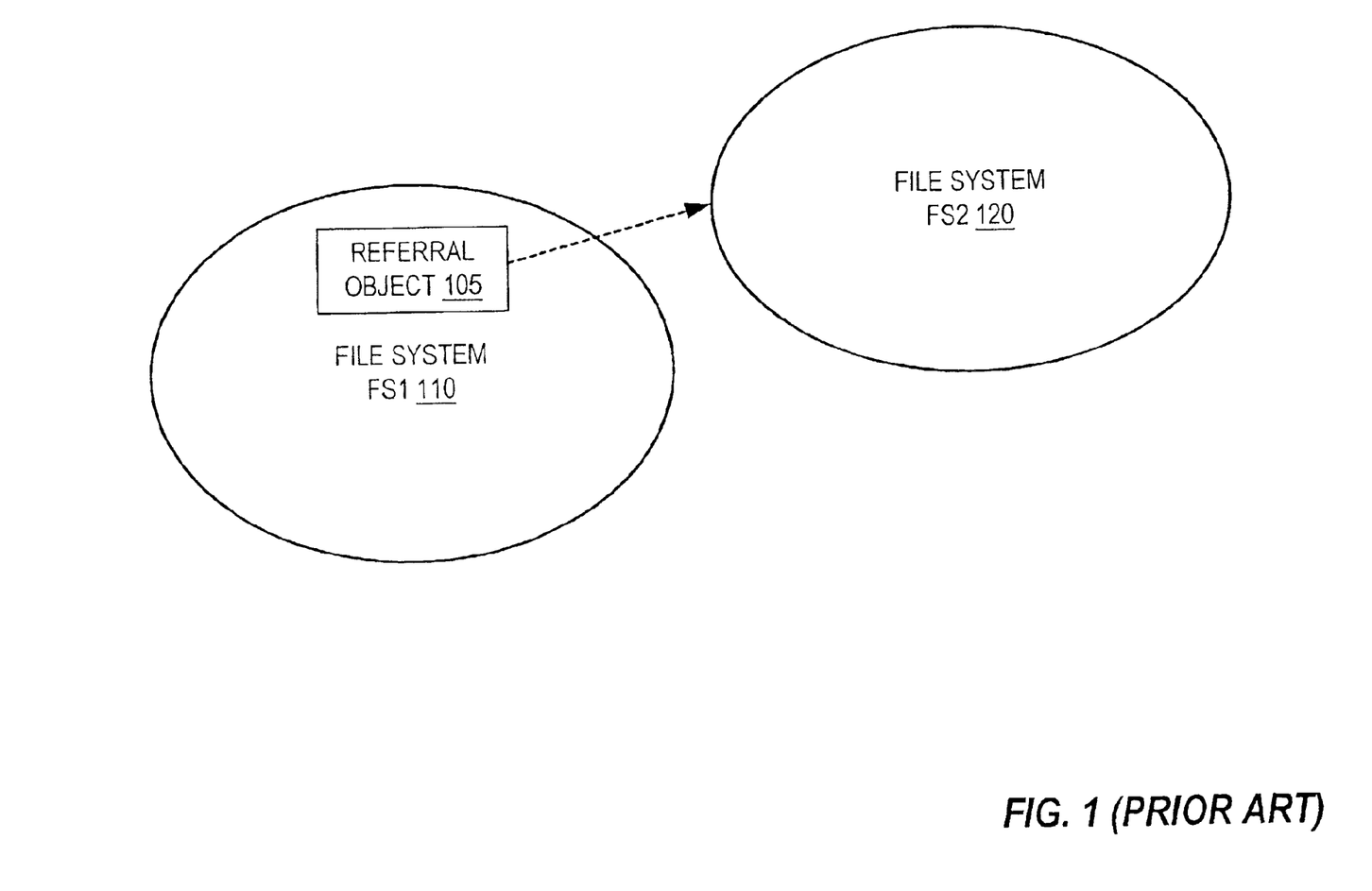
FIG. 1, described above, is a block diagram illustrating a referral object used to link together multiple file system trees, according to the prior art.
Figure 2:
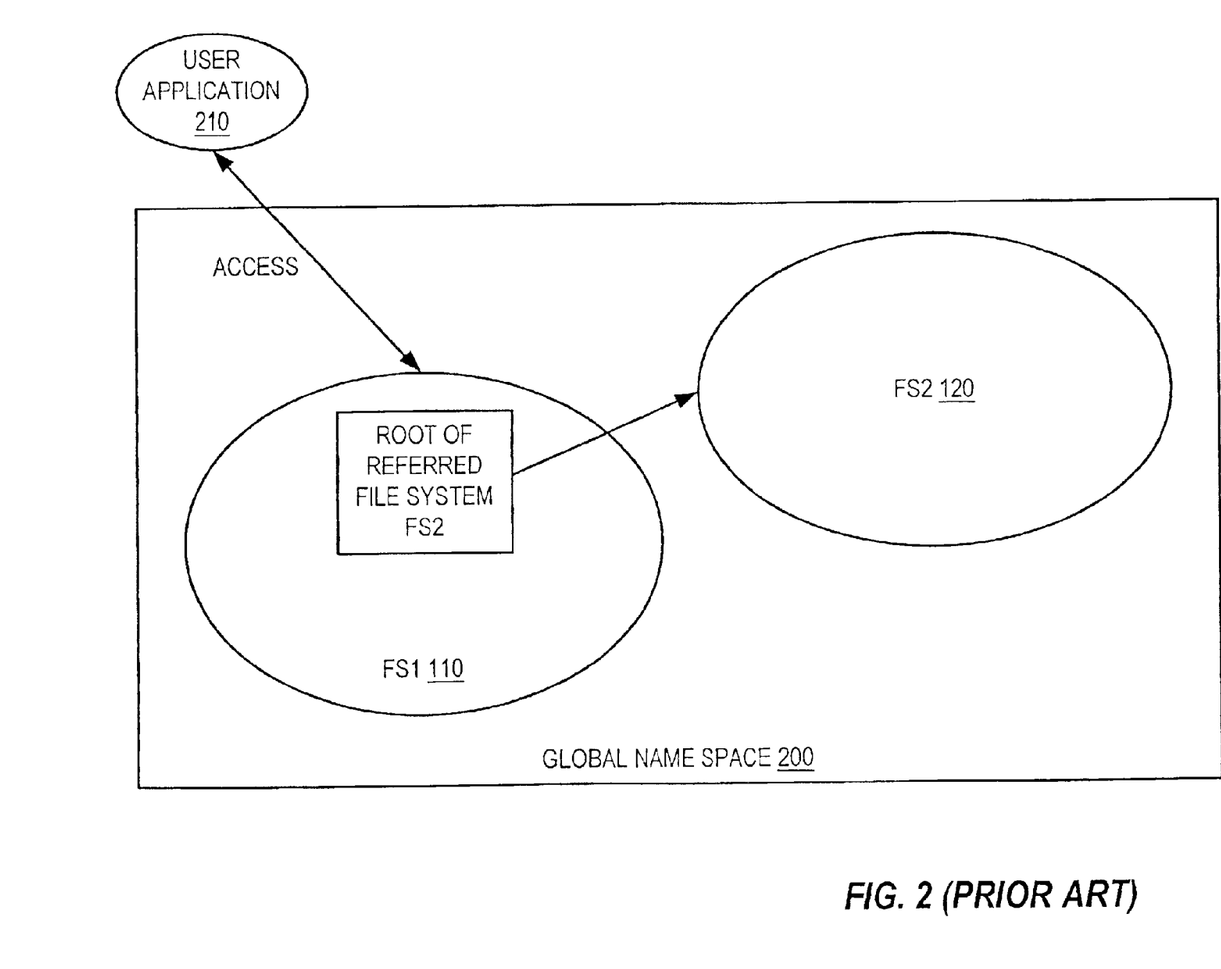
FIG. 2, described above, is a block diagram illustrating replacement of the referral object by the root of the referred file system, according to the prior art.

Referring to FIG. 1, a referral object 105, or simply "referral", is used to link together multiple file system trees into a single global name space. Referral 105 is a special object in a referring file system, e.g., file system FS1 110, which includes information to identify a referred file system, e.g., file system FS2 120. The information included in referral 105 may describe a server location and the path of the referred file system, and it may describe the information that a user application may need in order to access the referred file system, e.g., root of FS2 120. In some cases, the information included in referral 105 may include a key into a database, which then provides the server location and path of the referred file system. In a client/server architecture, referral 105 is used to redirect a client's request to another server. Referring to FIG. 2, referral 105 is replaced for the user application by the root of the referred file system, e.g., root of FS2 120, when accessed by a user application 210. A global single name space 200 is formed when the replacement is made.

It is often the case that file systems need to support looking up parent directories of a specified object, e.g., lookup the directory that includes the specified object. One example of the use of a lookup function is to construct an absolute path name for the specified object. The absolute path name is determined by climbing up the name space hierarchy using successive parent directory lookups until reaching the root of the name space. As another example, a server complying with NFS v4 functionality has a need to lookup the parent of an object when processing a LOOKUPP remote procedure call.

When global name space 200 is formed by using referrals, the parent directory of the root of a file system, as viewed by user application 210, may be located in a different file system, perhaps even on a different server. In addition, multiple referrals may refer to the same file system thus, when looking up a parent directory, the system should return a unique name. It is desirable that the name of the root directory be preferably returned as the name of the referral object referring to the root directory.

SUMMARY

The foregoing need is addressed by the present invention. According to one form of the invention, in a method for making file systems accessible, a referring file system attribute is created, responsive to a first file system having a referral object referring to a second file system. An "attribute" may be a field of a database record in a database context, for example, a property of an object in an object-oriented programming context, or an attribute of an element in a markup language context. A "data element" may be a record, for example, an object, or an element.

The referring file system attribute describes referring file system identification for the first file system. A path attribute is created, responsive to the first file system having the referral object, describing a path from a root of the first file system to the referral object. A referred file system attribute is created, responsive to the first file system having the referral object, describing a referred file system identification for the second file system. A parent attribute is created, responsive to the first file system having the referral object, describing a parent flag for the second file system.

In another aspect, the file systems are accessible within a global name space. Data elements having the attributes are configured for respective referral objects within the global name space and stored in a database. A dummy data element, describing a dummy referral to a root file system of the global name space, is stored in the database.

In yet another aspect of the invention a method to locate a parent directory of a second referral object includes receiving a request to locate the parent directory, the second referral object being located in a second referred file system. The database is searched for an entry matching the second referred file system. An entry matching the second referred file system is selected, wherein the entry has the parent attribute set to a true status.

Objects, advantages and other forms of the invention will be apparent upon reading the following detailed description and referring to the accompanying drawings.

DETAILED DESCRIPTION

The claims at the end of this application set out novel features which applicant believes are characteristic of the invention. The invention, a preferred mode of use, objectives and advantages, will best be understood by reference to the following detailed description of an illustrative embodiment read in conjunction with the accompanying drawings.

Figure 3A:
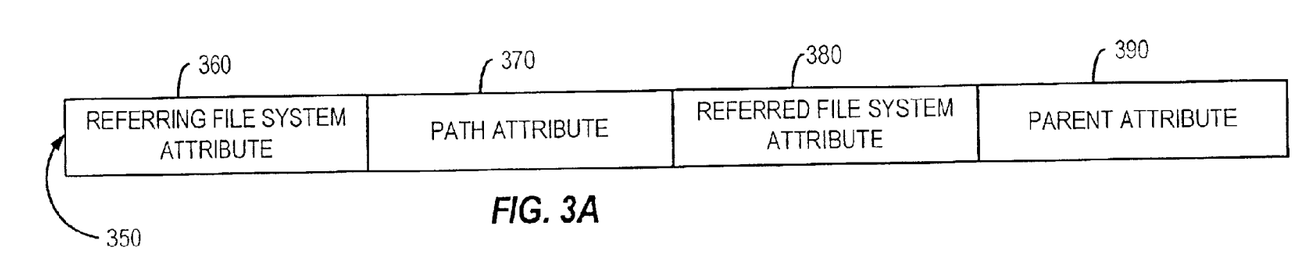
FIG. 3A is a data element having a plurality of attributes, according to an embodiment of the present invention.

Referring to FIG. 3A, a data element 350 is illustrated, according an embodiment of the present invention. This data element 350 is created (or defined) to facilitate access to a number of file systems. Data element 350 has a number of attributes, e.g., a referring file system attribute 360, a path attribute 370, a referred file system attribute 380, a parent attribute 390.

Figure 3B:
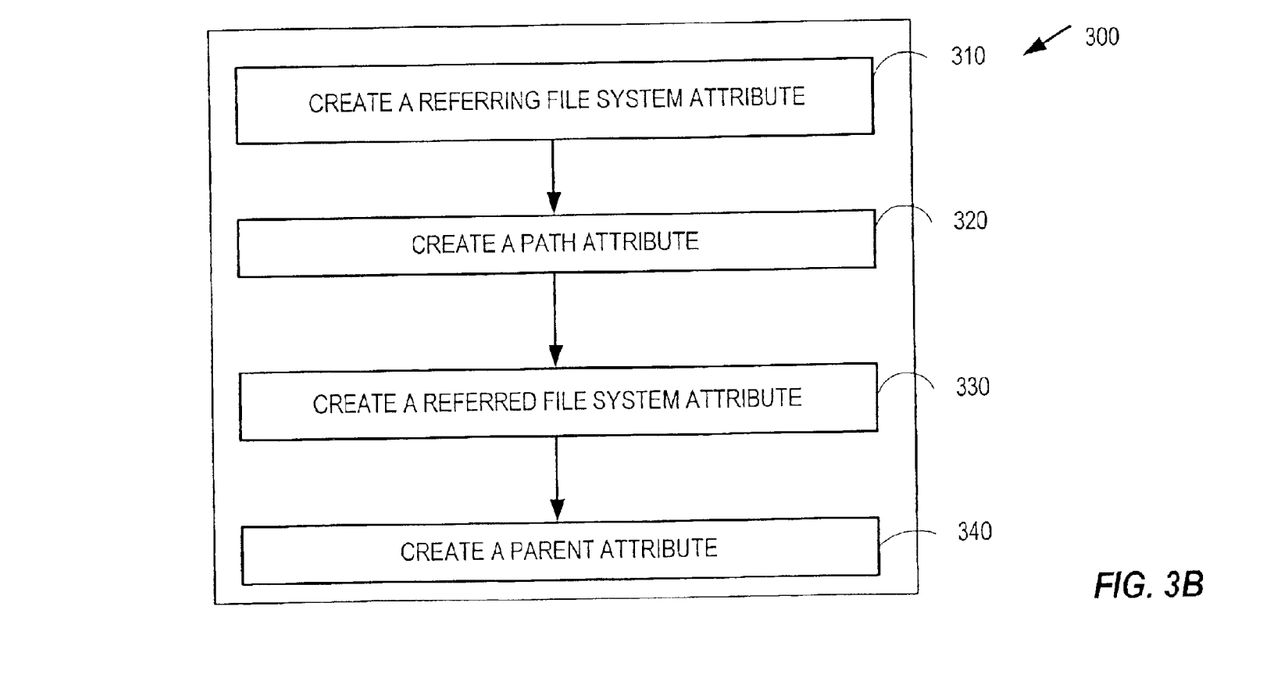
FIG. 3B is a flow chart illustrating a method for making a number of file systems accessible, according to an embodiment of the present invention.

Referring to FIG. 3B, a flow chart is shown illustrating a method for making a number of file systems accessible, in accordance with the present invention.

In block 310, referring file system attribute 360 of data element 350 is created in response to referral object 105, e.g., a first one of the file systems having a first referral object referring to a second one of the file systems. Referring file system attribute 360 describes a first referring file system identifier, e.g., FS1 100, for the first one of the file systems. The first referring file system identifier uniquely identifies the first referring file system in global name space 200.

In block 320, path attribute 370 of data element 350 is created, responsive to the first one of the file systems having the first referral object. Path attribute 370 describes a first path information for the first referral object. The first path information describes a path from the first one of the file systems root to the first referral object.

In block 330, referred file system attribute 380 of data element 350 is created, responsive to the first file system having the first referral object. Referred file system attribute 380 describes a first referred file system identifier, e.g., FS2 120, for the second one of the file systems. The first referred file system identifier uniquely identifies the first referred file system in global name space 200.

In block 340, parent attribute 390 of data element 350 is created, responsive to the first file system having the first referral object. Parent attribute 390 describes a first parent flag for the second one of the file systems. Parent attribute 390 is assigned a binary value, e.g., true or false, depending on the parent/child relationship between the first referring file system, e.g., FS1 110, and the first referred file system, e.g., FS2 120. For example, a true status for the first parent flag indicates that the first referring file system is the principal parent of the first referred file system. The parent flag is created to provide a unique, distinguished parent, by analogy with a biological parent, for the root of the file systems in case more than one referral exists for a file system.

Blocks 310–340 described above are combinable into a single block 300 for creating data element 350 structure having a plurality of attributes. In one embodiment, data element 350 may include additional attributes such as time of referral object creation, or an identification of the user who created the referral. Additional blocks may be added to blocks 310–340 to create these attributes.

Figure 4:
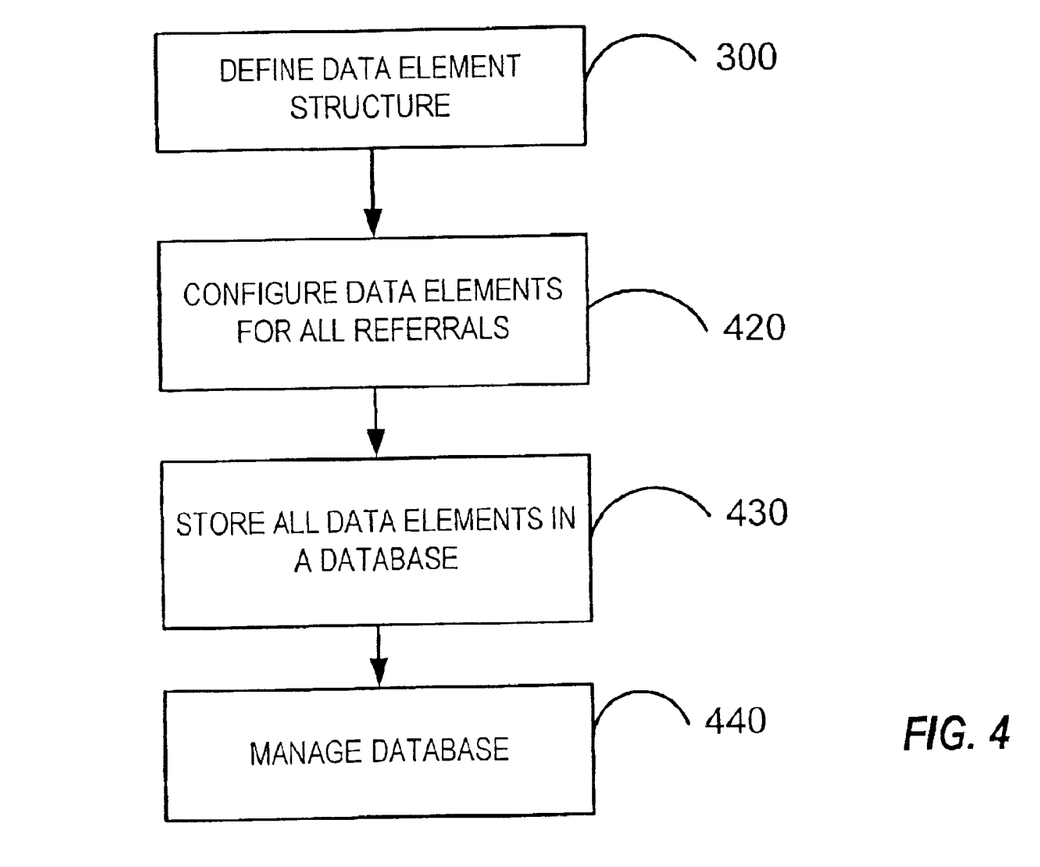
FIG. 4 is a flow chart illustrating a method of preparing a database for facilitating the accessibility of the number of file systems, according to an embodiment of the present invention.

Referring now to FIG. 4, a flow chart illustrating a method of preparing a database for facilitating the accessibility of the number of file systems, in accordance with the present invention, is shown. The number of file systems in global name space 200 includes a plurality of referral objects.

In block 300, data element 350 structure is defined as described in blocks 310–340 of FIG. 3B. In block 420, data elements are configured for respective referral objects within the global name space. Data element 350 corresponding to each referral object, e.g., referral 105, is said to be configured when each of the attributes described in blocks 310–340 have been assigned a value in response to referral object 105. All data elements are configured for respective referral objects within global name space 200. A dummy data element is configured describing a dummy referral to a root file system of the global name space.

In block 430, all data elements are stored in a database. The database is indexed by the referring file system, or by the referred file system or by both. In block 440, the database is managed by executing functions such as adding new data elements, deleting existing data elements or modifying existing data elements.

Figure 5A:
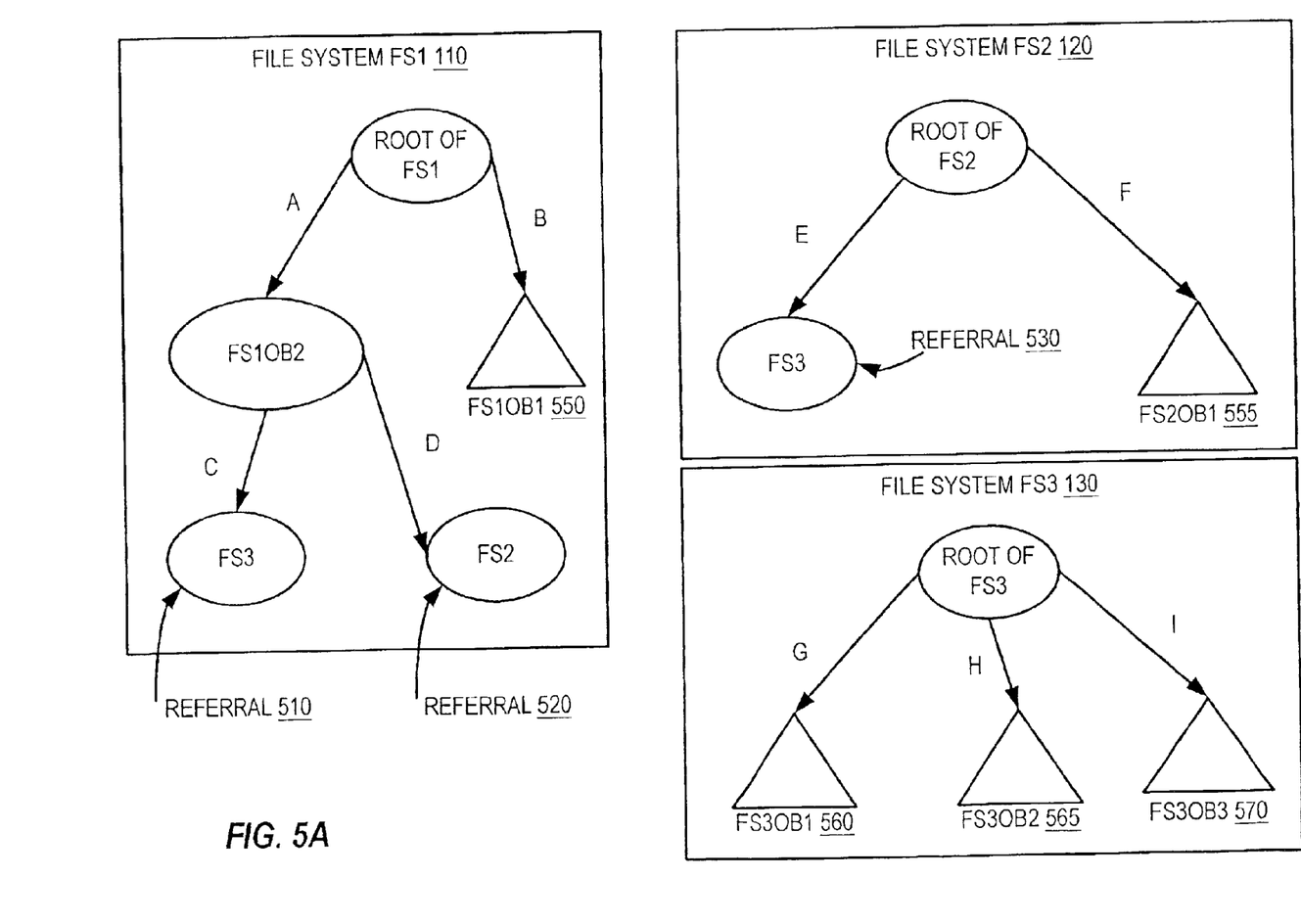
FIGS. 5A, 5B and 5C illustrate an example of creating a database that facilitates accessing a number of file systems included in global name space, according to an embodiment of the present invention.
Figure 5B:
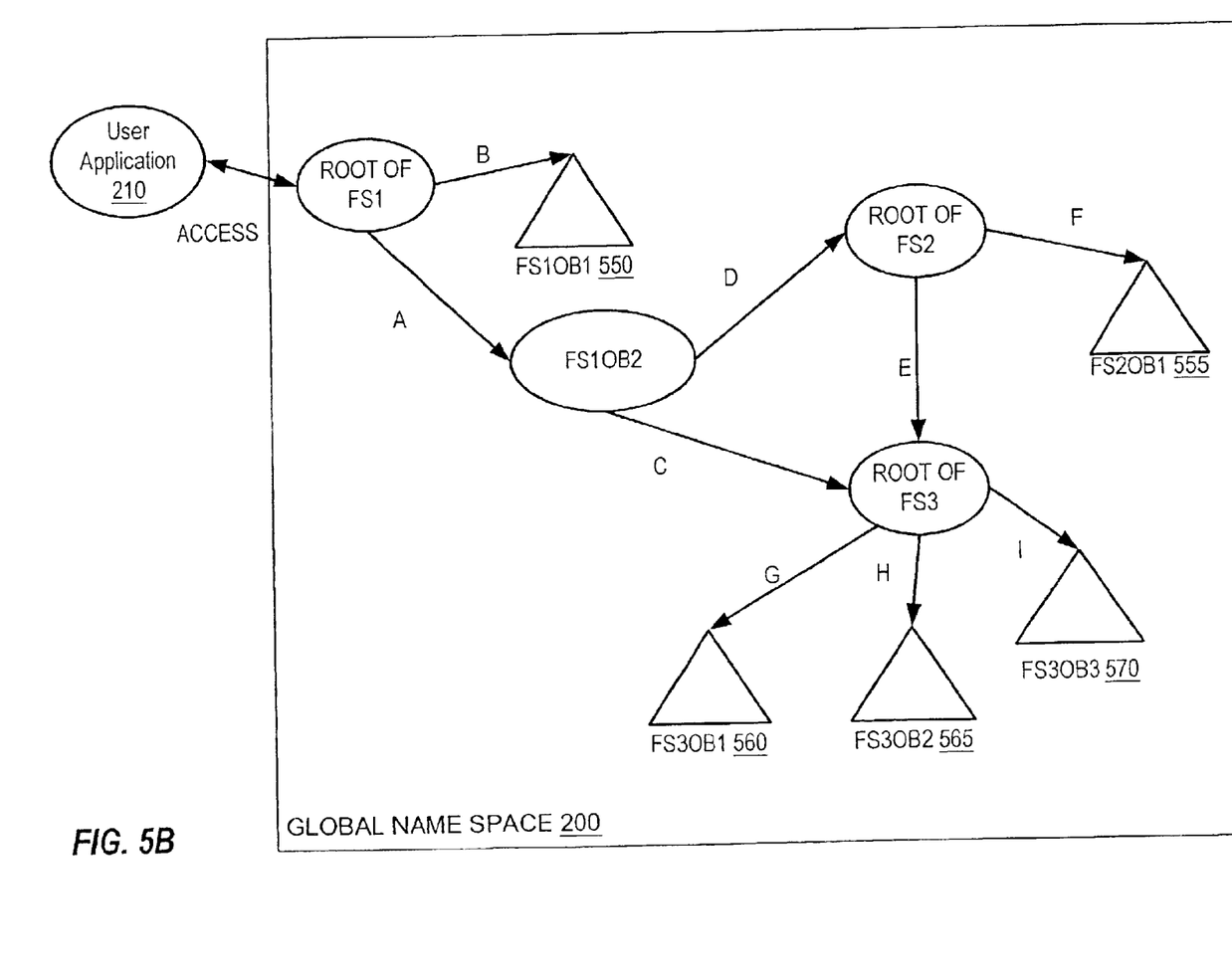
Figure 5C:
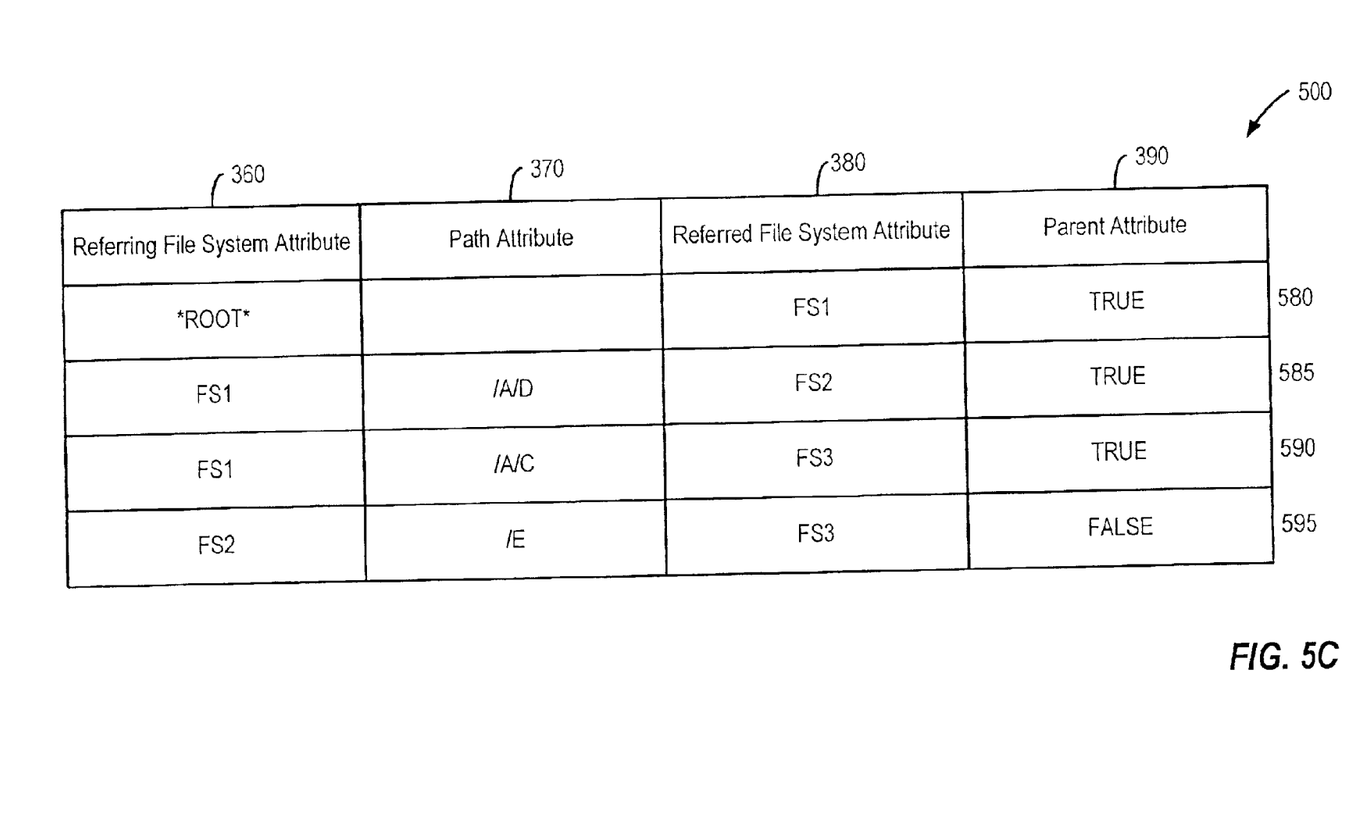

Referring now to FIGS. 5A, 5B and 5C, an example of creating a database that facilitates accessing a number of file systems included in global name space 200, in accordance with the present invention, is shown. Referring to FIG. 5A, a tree structure of file systems FS1 110, FS2 120 and FS3 130 having a plurality of referrals, e.g., referrals 510, 520 and 530, is shown. In the tree for FS1 110, path /B refers to object FS1OB1 550. Path /A/C refers to referral object 510, which refers to file system FS3 130. Path /A/D refers to referral object 520, which refers to file system FS2 120. In the tree for FS2 120, path /F refers to object FS2OB1 555. Path /E refers to referral object FS3 130. In the tree for FS3 130, path /G refers to object FS3OB1 560, path /H refers to object FS3OB2 565 and path /I refers to object FS3OB3 570.

Referring to FIG. 5B, user application 210 accessing a file system included in global name space 200 is shown. FS1 110 is the root file system in global name space 200. The root of the referred file system, e.g., FS2 120 and FS3 130, has replaced referral objects 510 and 520. Referring to FIG. 5C, a database 500 created to describe global name space 200, in accordance with the present invention, is shown. A dummy entry 580 in database 500 is a special entry since it refers to the highest file level of global name space 200, e.g., FS1 110. In dummy entry 580, referring file system attribute 360 is described by a special referring file system identifier, e.g., *ROOT*. An identifier for the top-level file system, e.g., FS1 110, is entered as the attribute value for referred file system attribute 380. Parent attribute 390 for the dummy entry is set to TRUE. The principal parent flag is used to provide a unique parent for the root of file systems in case more than one referral exists for a file system. Maintaining integrity of the status of parent flag is desirable to provide assurance that each referred file system has one and only one principal parent, e.g., a referral for which the principal parent flag is set to a TRUE status. For example, root of FS3 object has two parents. Object C is a referral from parent object FS1OB2 to root of FS3. Object E is a referral from parent object root of FS2 to root of FS3. Thus root of FS3 object is referred to by multiple file systems. That is, 2 referring file systems, e.g., FS2 120 and FS1 110, refer to file FS3 130. It may be possible that in global name space 200, path /A/C/G and path /A/D/E/G refer to the same object FS3OB1 560. However, as described in data element 590, FS1 110 is the only principal parent of FS3 130 since the parent flag attribute is set to TRUE.

Figure 6:
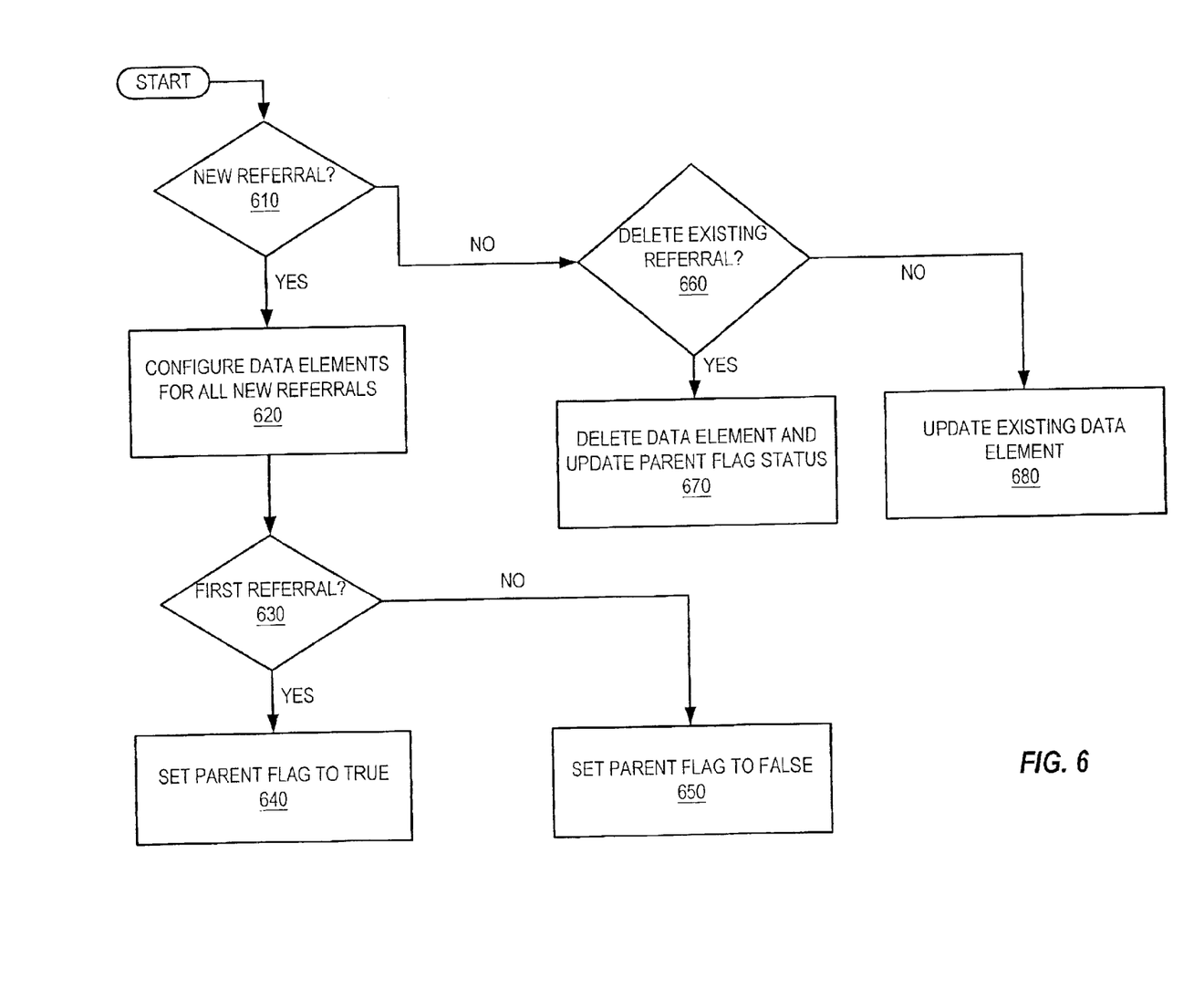
FIG. 6 is a flow chart illustrating a method a flow chart illustrating a method of managing the database, according to an embodiment of the present invention.

Referring now to FIG. 6, a flow chart illustrating a method of managing the database, in accordance with the present invention, is shown. In one embodiment, managing the database includes adding a new data element, deleting an existing data element or modifying an existing data element of database 500.

In block 610, a determination is made whether a data element exists in database 500 for a new referral object. In block 620, a new data element is configured corresponding to the new referral object in response to the new referral object. When a new referral is created, the data element corresponding to the referral is configured as described in block 420 of FIG. 4. The method of configuring and adding new data elements to database 500 may be performed by a special utility program that manipulates referrals.

In block 630, whenever a referral is configured and added to database 500, a check is made to see if there are other entries in the database that include referrals to the same file system. A determination is made if the referral added is not a first referral to this file system. If it is the first referral, the principal parent flag in the new referral is set to TRUE in block 640. Otherwise it is set to FALSE in block 650.

In block 660, a determination is made whether the referral object is to be deleted. In block 670, when a referral is deleted from the database, then if the principal flag is set to TRUE, and there are other entries that refer to the same file system, one of those referrals is selected to be the new principal. The selection may be based on criteria such as a chronology of referral creation. Following these procedures will assure that there will always be one and only one principal parent to each referred file system. The special utility program may modify the principal parent flag of file systems. In block 680, an existing data element is modified in response to a change in the referral object.

Database 500 (FIG. 5C) may be utilized to perform a variety of functions. These functions advantageously facilitate in accessing file systems included in global name space 200. For example, looking up parent directories of the root of a file system in global name space 200 is possible by looking in the database 500, and searching for an entry for a referral that refers to the file system in question. If there is more than one entry that matches the referred site, then the referral, which has the principal parent flag set to a TRUE status, is selected. The database also supports the name resolution of file system roots, which should be returned as the name of the referral object.

For example, database 500 is accessed to look up the parent of the root of file system FS3 130. Two entries 590 and 595, in database 500 match referred site FS3 130. However, only one entry 590 has a principal parent flag set to a TRUE status. The referring file system is FS1 110 and path is /A/C. Database 500 returns referral object A as the parent of FS3. Referral object C is the name of FS3 130 root.

In one embodiment, database 500 is accessed to allow an administrator or a user to browse and view global name space 200 at the file system level, by visualizing a graph of global name space 200 in which each node is a file system and a directed link between file systems corresponds to a referral. In another embodiment, database 500 is accessed to search for unreachable file systems, e.g., file systems that have no referrals. It may be advantageous to reclaim storage by deleting all nodes that may not be reachable from the root file system. In yet another embodiment, database 500 is accessed to enforce non-circular definitions of referrals. For example, a circular definition may exist when file system A is referred by file system B, which in turn is referred by file system A. In order to prevent an occurrence of an infinite loop while looking up a parent directory, the search may be limited to a finite number of iterations.

Figure 7:
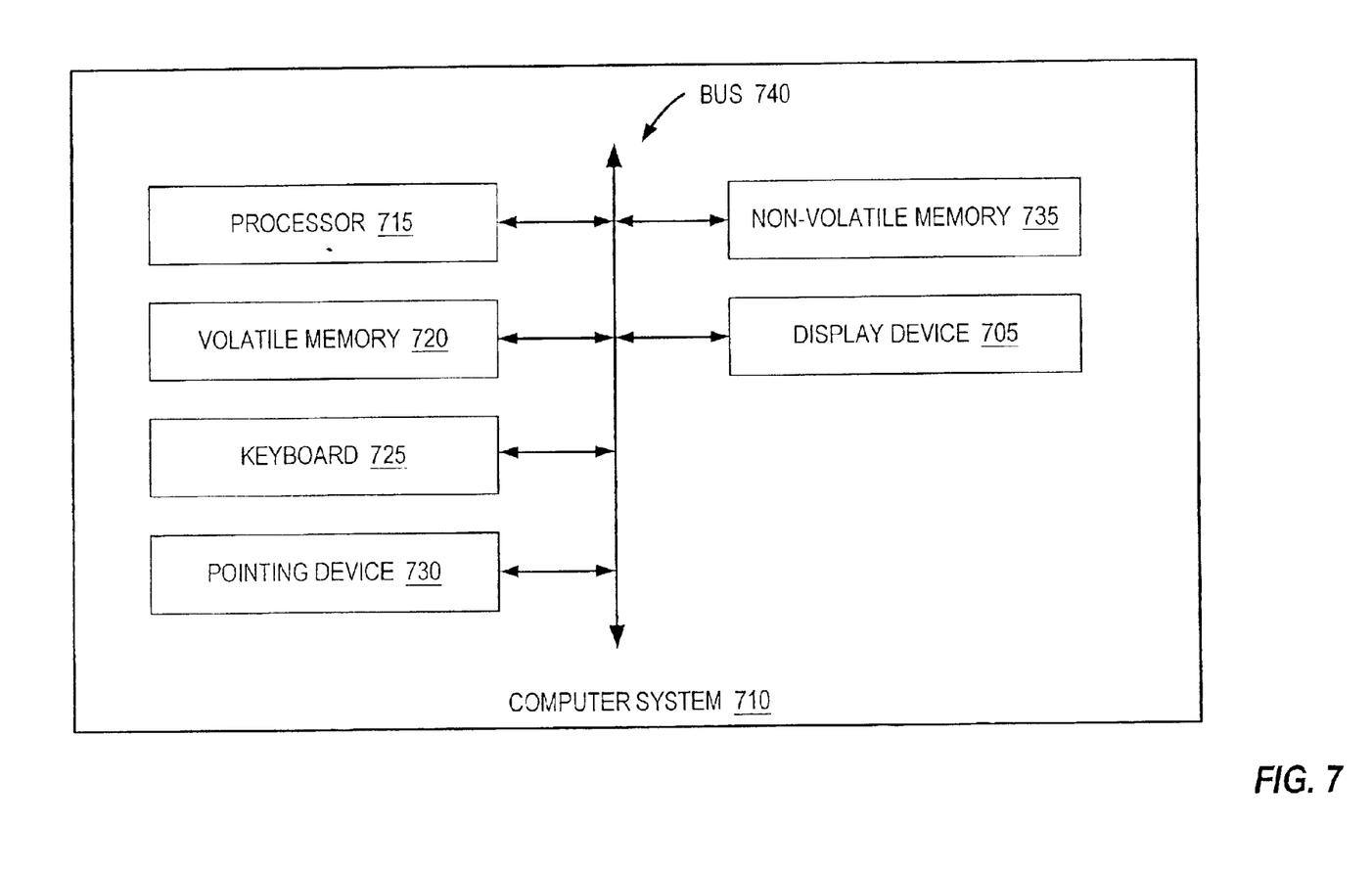
FIG. 7 illustrates a computer system to implement method or apparatus aspects of the present invention, according to an embodiment.

Referring to FIG. 7, a computer system 710 is shown that is generally applicable for the various embodiment described according to the present invention. The system 710 includes a processor 715, a volatile memory 720, e.g., RAM, a keyboard 725, a pointing device 730, e.g., a mouse, a nonvolatile memory 735, e.g., ROM, hard disk, floppy disk, CD-ROM, and DVD, and a display device 705 having a display screen. Memory 720 and 735 are for storing program instructions that are executable by processor 715 to implement various embodiments of a method in accordance with the present invention. Components included in system 710 are interconnected by bus 740. A communications device (not shown) may also be connected to bus 740 to enable information exchange between system 710 and other devices.

In various embodiments system 710 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, while certain aspects of the present invention have been described in the context of a fully functioning data processing system, those of ordinary skill in the art will appreciate that the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for making a number of file systems on a computer readable storage media accessible, the method comprising:

creating a referring file system attribute of a data element, responsive to a first one of the file systems having a first referral object referring to a second one of the file systems, the referring file system attribute describing a first referring file system identification for the first one of the file systems;

creating a path attribute of the data element, responsive to the first one of the file systems having the first referral object, the path attribute describing a first path information for the first referral object, wherein the first one of the file systems has a root and the first path information is for a path from the first one of the file systems root to the first referral object;

creating a referred file system attribute of the data element, responsive to the first file system having the first referral object, the first referred file system attribute describing a first referred file system identification for the second one of the file systems; and creating a parent attribute of the data element, responsive to the first file system having the first referral object, the parent attribute describing a first parent flag for the second one of the file systems.

2. The method of claim 1, wherein the file systems are accessible within a global name space.

3. The method of claim 2, comprising: configuring data elements for respective referral objects within the global name space; and storing the data elements in a database.

4. The method of claim 3, comprising storing a dummy data element in the database, the dummy data element describing a dummy referral to a root file system of the global name space.

5. The method of claim 4, comprising:

receiving a request to locate a parent directory of a second referral object, the second referral object being located in a second referred file system; searching the database for an entry matching the second referred file system; and selecting the entry matching the second referred file system, wherein the entry has the parent attribute set to a true status.

6. The method of claim 4, comprising browsing the global name space at a file system level by accessing the database.

7. The method of claim 1, comprising generating a second data element in response to creation of a second referral object, the second data element describing a second referring file system identifier, a second path information, a second referred file system identifier and a second principal parent flag indicating whether the second referring file system is the principal parent of the second referred file system.

8. The method of claim 7, comprising deleting the second data element in response to deletion of the second referral object.

9. The method of claim 7, wherein the creation of the second referral object comprises:

determining whether the second referral object is a first referral to the referred file system; and setting the first parent flag for the new referral object to a true status responsive to determining that the second referral object is the first referral.

10. The method of claim 9, comprising setting the first parent flag for the second referral object to a false status responsive to determining that the second referral object is not the first referral.

11. A computer program product for use in making a number of file systems accessible, the computer program product comprising computer readable storage media including program logic embedded therein that causes control circuitry to perform:

creating a referring file system attribute of a data element, responsive to a first one of the file systems having a first referral object referring to a second one of the file systems, the referring file system attribute describing a first referring file system identification for the first one of the file systems;

creating a path attribute of the data element, responsive to the first one of the file systems having the first referral object, the path attribute describing a first path information for the first referral object, wherein the first one of the file systems has a root and the first path information is for a path from the first one of the file systems root to the first referral object;

creating a referred file system attribute of the data element, responsive to the first file system having the first referral object, the first referred file system attribute describing a first referred file system identification for the second one of the file systems; and creating a parent attribute of the data element, responsive to the first file system having the first referral object, the parent attribute describing a first parent flag for the second one of the file systems.

12. The computer program product of claim 11, wherein the file systems are accessible within a global name space.

13. The computer program product of claim 12, wherein the computer readable storage media causes the control circuitry to perform:

configuring data elements for respective referral objects within the global name space; and storing the data elements in a database.

14. The computer program product of claim 13, wherein the computer readable storage media causes the control circuitry to perform:

storing a dummy data element in the database, the dummy data element describing a dummy referral to a root file system of the global name space.

15. The computer program product of claim 14, wherein the computer readable storage media causes the control circuitry to perform:

receiving a request to locate a parent directory of a second referral object, the second referral object being located in a second referred file system;

searching the database for an entry matching the second referred file system; and selecting the entry matching the second referred file system, wherein the entry has the parent attribute set to a true status.

16. The computer program product of claim 14, wherein the computer readable storage media causes the control circuitry to perform: browsing the global name space at a file system level by accessing the database.

17. The computer program product of claim 11, wherein the computer readable storage media causes the control circuitry to perform:

generating a second data element in response to creation of a second referral object, the second data element describing a second referring file system identifier, a second path information, a second referred file system identifier and a second principal parent flag indicating whether the second referring file system is the principal parent of the second referred file system.

18. The computer program product of claim 17, wherein the computer readable storage media causes the control circuitry to perform: deleting the second data element in response to deletion of the second referral object.

19. The computer program product of claim 17, wherein the creation of the second referral object comprises:
   determining whether the second referral object is a first referral to the referred file system; and setting the first parent flag for the new referral object to a true status responsive to determining that the second referral object is the first referral.

20. The computer program product of claim 19, wherein the computer readable storage media including causes the control circuitry to perform:
   setting the first parent flag for the second referral object to a false status responsive to determining that the second referral object is not the first referral.

21. An apparatus comprising:
   a processor; a file system coupled to a number of file systems;
   a memory storing instructions operable with the processor for accessing the number of file systems, the instructions being executed for:
   creating a referring file system attribute of a data element, responsive to a first one of the file systems having a first referral object referring to a second one of the file systems, the referring file system attribute describing a first referring file system identification for the first one of the file systems;
   creating a path attribute of the data element, responsive to the first one of the file systems having the first referral object, the path attribute describing a first path information for the first referral object, wherein the first one of the file systems has a root and the first path information is for a path from the first one of the file systems root to the first referral object;
   creating a referred file system attribute of the data element, responsive to the first file system having the first referral object, the first referred file system attribute describing a first referred file system identification for the second one of the file systems; and
   creating a parent attribute of the data element, responsive to the first file system having the first referral object, the parent attribute describing a first parent flag for the second one of the file systems.

22. The apparatus of claim 21, wherein the tile systems are accessible within a global name space.

23. The apparatus of claim 22, the instructions being executed for: configuring data elements for respective referral objects within the global name space; and storing the data elements in a database.

24. The apparatus of claim 23, the instructions being executed for storing a dummy data element in the database, the dummy data element describing a dummy referral to a root file system of the global name space.

25. The apparatus of claim 24, the instructions being executed for:
   receiving a request to locate a parent directory of a second referral object, the second referral object being located in a second referred file system; searching the database for an entry matching the second referred file system; and selecting the entry matching the second referred file system, wherein the entry has the parent attribute set to a true status.

26. The apparatus of claim 24, the instructions being executed for browsing the global name space at a file system level by accessing the database.

27. The apparatus of claim 21, the instructions being executed for generating a second data element in response to creation of a second referral object, the second data element describing a second referring file system identifier, a second path information, a second referred file system identifier and a second principal parent flag indicating whether the second referring file system is the principal parent of the second referred file system.

28. The apparatus of claim 27, the instructions being executed for deleting the second data element in response to deletion of the second referral object.

29. The apparatus of claim 27, wherein the creation of the second referral object comprises:
   determining whether the second referral object is a first referral to the referred file system; and setting the first parent flag for the new referral object to a true status responsive to determining that the second referral object is the first referral.

30. The apparatus of claim 29, the instructions being executed for setting the first parent flag for the second referral object to a false status responsive to determining that the second referral object is not the first referral.

31. An apparatus for making a number of file systems accessible, the apparatus comprising:
   means for creating a referring file system attribute of a data element, responsive to a first one of the file systems having a first referral object referring to a second one of the file systems, the referring file system attribute describing a first referring file system identification for the first one of the file systems;
   means for creating a path attribute of the data element, responsive to the first one of the file systems having the first referral object, the path attribute describing a first path information for the first referral object, wherein the first one of the file systems has a root and the first path information is for a path from the first one of the file systems root to the first referral object;
   means for creating a referred file system attribute of the data element, responsive to the first file system having the first referral object, the first referred file system attribute describing a first referred file system identification for the second one of the file systems; and
   means for creating a parent attribute of the data element, responsive to the first file system having the first referral object, the parent attribute describing a first parent flag for the second one of the file systems.

32. The apparatus of claim 31, wherein the file systems are accessible within a global name space.

33. The apparatus of claim 32, comprising:
   means for configuring data elements for respective referral objects within the global name space; and
   means for configuring the data elements in a database.

34. The apparatus of claim 33, comprising: means for storing a dummy data element in the database, the dummy data element describing a dummy referral to a root file system of the global name space.

35. The apparatus of claim 34, comprising:
   means for receiving a request to locate a parent directory of a second referral object, the second referral object being located in a second referred file system;
   means for searching the database for an entry matching the second referred file system; and
   means for selecting the entry matching the second referred file system, wherein the entry has the parent attribute set to a true status.

36. The apparatus of claim 34, comprising: means for browsing the global name space at a file system level by accessing the database.

37. The apparatus of claim 31, comprising:

means for generating a second data element in response to creation of a second referral object, the second data element describing a second referring file system identifier, a second path information, a second referred file system identifier and a second principal parent flag indicating whether the second referring file system is the principal parent of the second referred file system.

38. The apparatus of claim 37, comprising:

means for deleting the second data element in response to deletion of the second referral object.

39. The apparatus of claim 37, comprising:

means for determining whether the second referral object is a first referral to the referred file system; and means for setting the first parent flag for the new referral object to a true status responsive to determining that the second referral object is the first referral.

40. The apparatus of claim 39, comprising: means for setting the first parent flag for the second referral object to a false status responsive to determining that the second referral object is not the first referral.

* * * * *